(12) United States Patent
Furukawa et al.

(10) Patent No.: US 11,755,856 B2
(45) Date of Patent: Sep. 12, 2023

(54) LABEL ISSUING APPARATUS AND LABEL READING APPARATUS

(71) Applicant: Ishida Co., Ltd., Kyoto (JP)

(72) Inventors: Takashi Furukawa, Ritto (JP); Masatsugu Tanaka, Ritto (JP); Mitsuhiro Yoshida, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 17/553,389

(22) Filed: Dec. 16, 2021

(65) Prior Publication Data
US 2022/0198166 A1    Jun. 23, 2022

(30) Foreign Application Priority Data

Dec. 23, 2020    (JP) ................................ 2020-213977
Dec. 23, 2020    (JP) ................................ 2020-213994

(51) Int. Cl.
    *G06K 1/12*      (2006.01)
    *G06K 7/14*      (2006.01)
    *G06F 3/12*      (2006.01)
    *H04N 1/32*      (2006.01)

(52) U.S. Cl.
CPC ......... *G06K 7/1413* (2013.01); *G06F 3/1208* (2013.01); *G06F 3/1243* (2013.01); *G06K 1/121* (2013.01); *H04N 1/32288* (2013.01); *H04N 2201/3269* (2013.01)

(58) Field of Classification Search
CPC .............................. G06K 7/1413; G06K 1/121
USPC .................. 235/462.01, 462.09, 494
See application file for complete search history.

(56) References Cited

U.S. PATENT DOCUMENTS

| | | | | |
|---|---|---|---|---|
| 2002/0170966 A1* | 11/2002 | Hannigan | ........ | G11B 20/00086 |
| | | | | 707/E17.112 |
| 2005/0286088 A1* | 12/2005 | Takagi | ............... | H04N 1/32261 |
| | | | | 358/3.28 |
| 2006/0016867 A1* | 1/2006 | Tani | ...................... | G06Q 10/08 |
| | | | | 235/375 |

(Continued)

FOREIGN PATENT DOCUMENTS

| | | | |
|---|---|---|---|
| JP | 2008-252482 A | 10/2008 | |
| JP | 2015-033809 A | 2/2015 | |

OTHER PUBLICATIONS

The extended European search report issued by the European Patent Office dated May 23, 2022, which corresponds to European Patent Application No. 21214433.1-1224 and is related to U.S. Appl. No. 17/553,389.

*Primary Examiner* — Paultep Savusdiphol
(74) *Attorney, Agent, or Firm* — Studebaker & Brackett PC

(57) ABSTRACT

A label issuing apparatus includes: a storage unit that stores a plurality of pieces of product information regarding a product; a print control unit that generates print data defining that a barcode, in which at least one piece of the product information stored in the storage unit is encoded, and a digital watermark, in which at least one piece of the product information encoded as the barcode is embedded, are arranged on one product label and the barcode and the digital watermark are arranged at different positions on the one product label; and a label issuing unit that issues the product label on which the barcode and the digital watermark are displayed at different positions by printing information based on the print data on a label.

2 Claims, 9 Drawing Sheets

(56) References Cited

U.S. PATENT DOCUMENTS

| | | | |
|---|---|---|---|
| 2012/0146784 A1* | 6/2012 | Hines | A42B 3/046 |
| | | | 2/2.5 |
| 2012/0192738 A1* | 8/2012 | Sanger | B41F 5/24 |
| | | | 101/401 |
| 2012/0196229 A1* | 8/2012 | Sanger | B41M 1/04 |
| | | | 430/306 |
| 2017/0220741 A1* | 8/2017 | Toupin | H04M 3/4936 |
| 2020/0265446 A1* | 8/2020 | Vargas | G06Q 10/087 |
| 2021/0073500 A1* | 3/2021 | Santi | G06K 7/1443 |

\* cited by examiner

LABEL ISSUING APPARATUS AND LABEL READING APPARATUS

TECHNICAL FIELD

One aspect of the present invention relates to a label issuing apparatus and a label reading apparatus.

BACKGROUND

Conventionally, a product label printed with a barcode having encoded product information has been attached to a product. Then, by reading the barcode with a reading means, the price of the product is paid at the cash register or the like, or the inventory is managed at the warehouse or the like. However, for example, if the product label is wrinkled or a part of the barcode is dirty, there is a problem that the barcode cannot be read by the reading means. Therefore, it has been proposed to print a digital watermark, which can be printed on the entire product label and has excellent reading accuracy by the reading means such as a camera, on the product label (see Patent Literature 1: Japanese Unexamined Patent Publication No. 2008-252482). If such a digital watermark is adopted for a product label, it is considered that the above-described problem can be solved.

SUMMARY

Incidentally, since the reading means capable of reading a digital watermark has not yet become widespread, the inventors thought that there was a need to print a product label having both a barcode and a digital watermark thereon. However, when a digital watermark overlaps a barcode, the contrast between the bar and the space in the barcode cannot be obtained, and accordingly, a new problem arises that the accuracy of barcode reading by the reading means is lowered.

Therefore, it is an object of one aspect of the invention to provide a label issuing apparatus and a label reading apparatus capable of reducing the lowering of the accuracy of barcode reading by a reading means even when both a barcode and a digital watermark are printed on one product label.

A label issuing apparatus according to an aspect of the invention includes: a storage unit configured to store a plurality of pieces of product information regarding a product; a print control unit configured to generate print data defining that a barcode, in which at least one piece of the product information stored in the storage unit is encoded, and a digital watermark, in which at least one piece of the product information encoded as the barcode is embedded, are arranged on one product label and the barcode and the digital watermark are arranged at different positions on the one product label; and a label issuing unit configured to issue the product label on which the barcode and the digital watermark are displayed at different positions by printing information based on the print data on a label.

The label issuing apparatus having this configuration issues one product label on which both the barcode and the digital watermark relevant to at least one piece of product information are displayed. Therefore, for example, even if the product label is wrinkled or a part of the barcode is dirty, the product information can be acquired from the digital watermark. In addition, the label issuing apparatus having this configuration issues a product label, on which the barcode and the digital watermark are arranged at different positions, based on the print data defining that the barcode and the digital watermark are arranged at different positions (so as not to overlap each other) on one product label. Therefore, the contrast between the bar and the space in the barcode is ensured. As a result, even when both a barcode and a digital watermark are printed on one product label, it is possible to reduce the lowering of the accuracy of barcode reading by the reading means.

In the label issuing apparatus according to the aspect of the invention, the product information encoded as the barcode and the product information embedded as the digital watermark may be the same. In this configuration, the amount of information embedded as a digital watermark can be minimized.

In the label issuing apparatus according to the aspect of the invention, the print control unit may generate the print data defining that the digital watermark is arranged so as to surround an area where the barcode is arranged. In this configuration, the digital watermark can be widely arranged on one product label. Therefore, it is possible to improve the readability of the digital watermark by the reading means.

In the label issuing apparatus according to the aspect of the invention, the label issuing unit may issue the product label on which the digital watermark is displayed so as to surround an area where the barcode is displayed. In this configuration, the digital watermark can be widely arranged on one product label. Therefore, it is possible to issue the product label that can improve the readability of the digital watermark by the reading means.

In the label issuing apparatus according to the aspect of the invention, the print control unit may generate the print data defining that a margin area where the digital watermark is not arranged is present around the barcode, and the label issuing unit may issue the product label in which the margin area is present around the barcode. Therefore, it is possible to further improve the readability of the barcode by the reading means.

In the label issuing apparatus according to the aspect of the invention, the print control unit may execute: a first process of generating first data defining that the digital watermark is arranged in an entire area of the one product label; a second process of generating second data defining that the barcode is arranged in a first predetermined area on the product label; a third process of generating third data defining that the digital watermark is arranged at a position different from the first predetermined area on the one product label based on the first data and the second data; and a fourth process of generating the print data based on the second data and the third data. The label issuing apparatus that executes such processes can generate print data defining that a barcode and a digital watermark are arranged so as not to overlap each other on one product label.

In the label issuing apparatus according to the aspect of the invention, the print control unit may execute: a fifth process of generating fifth data defining that the barcode is arranged in a predetermined area on the one the product label; a sixth process of generating sixth data defining that a dividing line for dividing the one product label into two areas is arranged so as not to cross the predetermined area; a seventh process of generating seventh data defining that the digital watermark is arranged in an entire area where the predetermined area is not present between the two areas generated by division by the dividing line, based on the fifth data and the sixth data; and an eighth process of generating the print data based on the fifth data and the seventh data. The label issuing apparatus that executes such processes can generate print data defining that a barcode and a digital watermark are arranged so as not to overlap each other on one product label.

In the label issuing apparatus according to the aspect of the invention, the print control unit may determine a size of the product label based on the product information included in the print data. In this configuration, it is possible to prevent the product label from becoming unnecessarily long.

In the label issuing apparatus according to the aspect of the invention, when a digital watermark in which at least one piece of the product information stored in the storage unit is embedded is arranged on a product label, the print control unit may generate print data in which an arrangement area of the digital watermark is specified based on a size of the product label predicted from a product information display portion in which at least one piece of the product information stored in the storage unit is displayed.

A technique relevant to a product label (information display medium) on which a digital watermark portion, in which predetermined information (for example, a product name, a product management number, a management deadline, a manufacturing date, and a price) is embedded, is printed is disclosed in, for example, Patent Literature 2 (Japanese Unexamined Patent Publication No. 2008-252482). In such a product label, the print size of the digital watermark that matches the size of the issued product label is input in advance so that the digital watermark is printed over the entire size of the product label. Patent Literature 3 (Japanese Unexamined Patent Publication No. 2015-033809) discloses label issuing apparatus a label issuing apparatus that prints predetermined product information on a mountless label to which no mount is attached. According to the label issuing apparatus described in Patent Literature 3, the size of the product label can be reduced or increased according to the printed content. Even when a product label printed with a digital watermark is issued by the label issuing apparatus of the type described in Patent Literature 3 that prints product information on a mountless label, it is considered necessary to input the digital watermark size in advance according to the size of the product label issued as in the related art described above.

In the case of the mountless label described in Patent Literature 3, however, the length of the product label issued varies depending on the content to be printed. For this reason, when the size of the digital watermark input in advance is smaller than the size of the product label actually issued, the digital watermark is not arranged over the entire size of the product label. As a result, the readability of the digital watermark by the reading means is reduced. In addition, when the size of the digital watermark input in advance is larger than the size of the product label actually issued, a margin portion in which only the digital watermark is printed is formed. Therefore, there is a possibility that the product label will be unnecessarily long.

In this configuration, since the arrangement area of the digital watermark in the product label is specified based on the size of the product label predicted from the product information display portion printed as the product label, a situation in which the size of the digital watermark is extremely smaller or larger than the size of the product information display portion does not occur. This solves a problem that the digital watermark is not arranged over the entire size of the product label and a problem that a margin portion where only the digital watermark is printed is formed. That is, when issuing a product label by printing the information including a digital watermark on the mountless label, it is possible to issue a product label having a high readability of the digital watermark by the reading means and a small margin portion. In addition, at least one piece of product information stored in the storage unit, which is displayed as a product information display portion, and at least one piece of product information stored in the storage unit, which is embedded as a digital watermark, may completely match each other, or may partially match each other, or may not completely match each other.

A label reading apparatus according to the aspect of the invention includes: a reading unit configured to read the product label issued from the label issuing apparatus described above; and a reading control unit configured to decode read information. The reading means reads both the barcode and the digital watermark printed on the product label. When it is determined that at least one of the barcode and the digital watermark read by the reading means is decodable, the reading control unit determines that information decoded from at least one of the barcode and the digital watermark is the product information regarding the product. In this configuration, it is possible to enhance the identity between the information written on the product label and the information read by the reading means.

According to the aspect of the invention, even when both the barcode and the digital watermark are printed on one product label, it is possible to reduce the lowering of the accuracy of barcode reading by the reading means.

DETAILED DESCRIPTION

Figure 1:
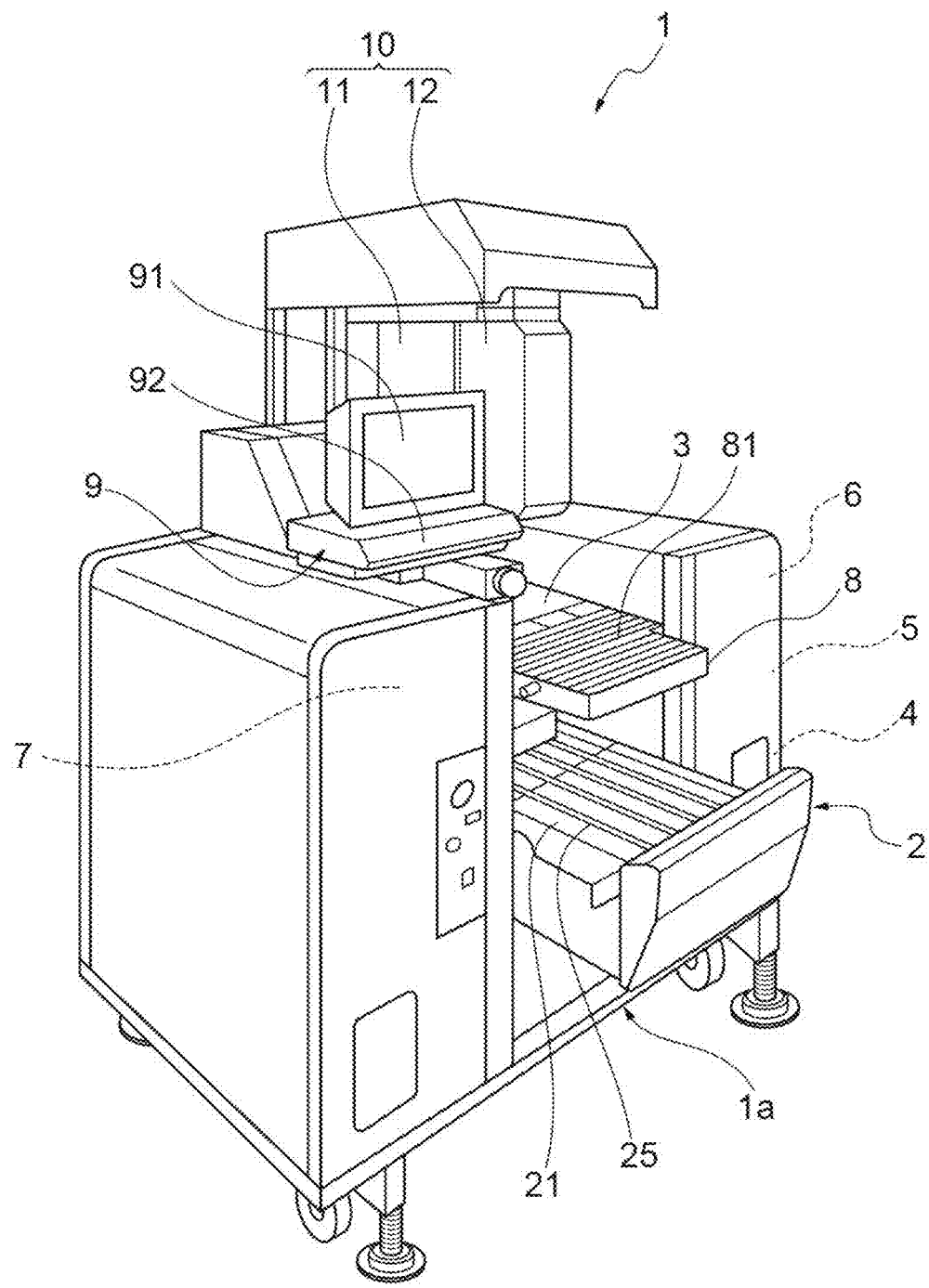
FIG. 1 is an external perspective view showing a weighing and packaging pricing device including a label printer of an embodiment.

Hereinafter, a case where a label printer (label issuing unit) 11, which is a preferred embodiment of one aspect of the invention, is applied to a weighing and packaging pricing device (label issuing apparatus) 1 will be described in detail with reference to the diagrams. In addition, in the description of the diagrams, the same elements are denoted by the same reference numerals, and repeated description thereof will be omitted.

The weighing and packaging pricing apparatus 1 shown in FIG. 1 is a device that, after weighing and packaging a product, issues a product label L (see FIG. 3A) on which information regarding the product is printed and attaches the product label L to the product. In the weighing and packaging pricing apparatus 1 of the present embodiment, after weighing a product, a product that is the content placed on a tray, such as fresh food, or a product that is not placed on a tray, such as a fruit and a vegetable, is pushed up against a stretch film that keeps tension, and a peripheral portion of the film is folded to the bottom surface side of the tray or below the product, thereby performing film packaging. Then, the product label L printed on the packaged product is attached. In addition, the product label L may be manually attached to the packaged product by an operator. Hereinafter, a process of issuing a product label of a product placed on a tray and attaching the issued product label to the product will be described after describing the overview of device configuration.

The weighing and packaging pricing apparatus 1 includes a weighing and carrying mechanism 2 in which a weighing mechanism is provided, a lift mechanism (not shown) that is arranged after the weighing and carrying mechanism 2 to raise a product up to a packaging station 3, a film roll support mechanism 4, a film feeding mechanism 5, a film transport mechanism 6, a folding mechanism 7, a sealing mechanism 8, a pricing machine 10, and a control device 9.

The weighing and carrying mechanism 2 is provided at the center of the front of the main body 1a. The weighing and carrying mechanism 2 includes a weighing table 21 that is loaded on a load sensor, such as a load cell, and measures the weight of a product such as food placed on a tray and a transport mechanism 25 that transports the product placed on the weighing table 21 to the packaging station 3. When a product is placed on the weighing table 21, the weight of the product is measured by a load sensor that supports the weighing table 21, and then the product is transported to the packaging station 3 by the transport mechanism 25. The film roll support mechanism 4 is arranged on both sides of the main body 1a to hold a film roll. The film feeding mechanism 5 feeds a film drawn from the film roll upward. The film transport mechanism 6 receives the film from the film feeding mechanism and transports the film to the packaging station 3, which is a space formed in the main body 1a.

A lift mechanism (not shown) raises the product received from the weighing and carrying mechanism 2 and lifts the film stretched on the packaging station 3 from below. The folding mechanism 7 folds the film lifted by the product around the product at the packaging station 3, thereby packaging the product. The sealing mechanism 8 heat-seals the film folded on the bottom surface side of the product by the folding mechanism 7. The pricing machine 10 issues a product label L on which product information (weight, price, and the like), which is information regarding the product, is printed, and attaches the product label L to the product. The pricing machine 10 is arranged above the folding mechanism 7 and the sealing mechanism 8.

The pricing machine 10 includes a label printer 11 and an attaching machine 12, and the label printer 11 and the attaching machine 12 are integrally configured. The label printer 11 issues the product label L (see FIG. 3A) by printing information based on print data, which will be described in detail later, on a label LR (see FIG. 3A). The label LR of the present embodiment may be a label with a mount, or may be a mountless label to which no mount is attached. The label printer 11 stores a label roll in which the label LR is wound around a core material or the like, and issues the product label L by printing information based on print data on the label LR unwound from the label roll. The attaching machine 12 is provided so as to be movable between the label printer 11 and the product to which the product label L is attached, and attaches the product label L received from the label printer 11 to the product packaged by the film.

Figure 2:
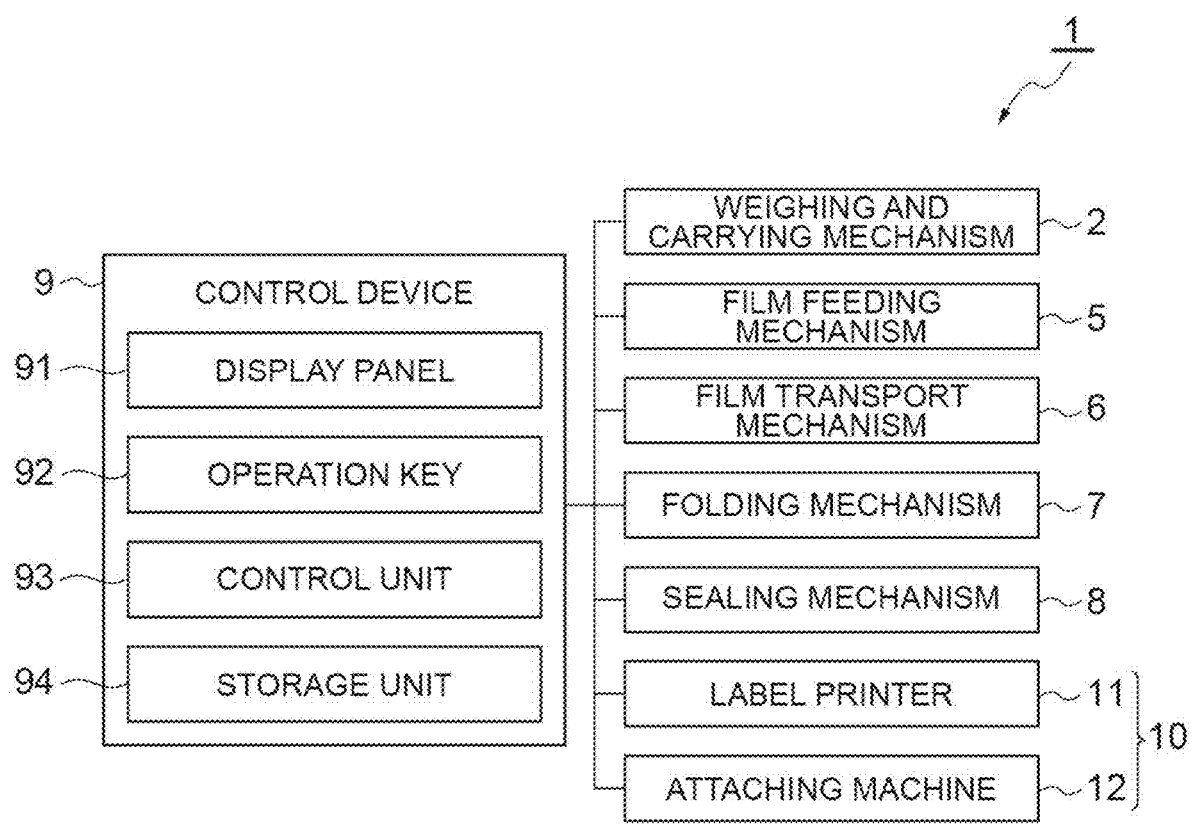
FIG. 2 is a block diagram showing the functional configuration of the weighing and packaging pricing device shown in FIG. 1.

As shown in FIGS. 1 and 2, the control device 9 having a display panel 91, an operation key 92, a control unit (print control unit) 93, and a storage unit 94 is arranged in the upper portion of the main body 1a. The control device 9 controls the operation of each of the above mechanisms (the weighing and carrying mechanism 2, the lift mechanism (not shown), the film feeding mechanism 5, the film transport mechanism 6, the folding mechanism 7, the sealing mechanism 8, and the pricing machine 10).

The display panel 91 is a touch panel capable of displaying various kinds of information for the operator and receiving the operation of the operator. The operation key 92 receives a checking operation or the like by the operator.

The control unit 93 includes an input and output interface for receiving and outputting a signal from and to the outside, a storage medium such as a ROM (Read Only Memory) that stores programs, information, and the like for performing processing and a RAM (Random Access Memory) that temporarily stores data, a CPU (Central Processing Unit), and a communication circuit. The control unit 93 stores the input data in the RAM based on the signal output from the CPU, loads the program stored in the ROM to the RAM, and executes the program loaded to the RAM to execute various processes.

When the product selected by the operation of the operation key 92 by the operator is placed on the weighing table 21, the control unit 93 calculates the price of the product based on the weight of the weighed product. The control unit 93 reads product information such as raw materials stored for each product from the storage unit 94, and controls the label printer 11 to issue the product label L on which the weight, price, and the like of the product are printed. In addition, the process of issuing the product label L will be described in detail later. The control unit 93 also executes a process of encoding the JAN code stored in the storage unit 94 as a barcode A3 (see FIG. 3A) and embedding the JAN code as a digital watermark A5 (see FIG. 3A). The control unit 93 controls the attaching machine 12 to attach the product label L to the film-packaged product.

The storage unit 94 stores a plurality of pieces of product information regarding the product. For example, for each product, the storage unit 94 stores product information, such as a product ID, a manufacturer ID, a product name, a unit price, a production area, a manufacture date, an expiration date, and a JAN code. In addition, the storage unit 94 also stores a format that defines which product information is arranged in which area of one product label L.

Figure 3A:
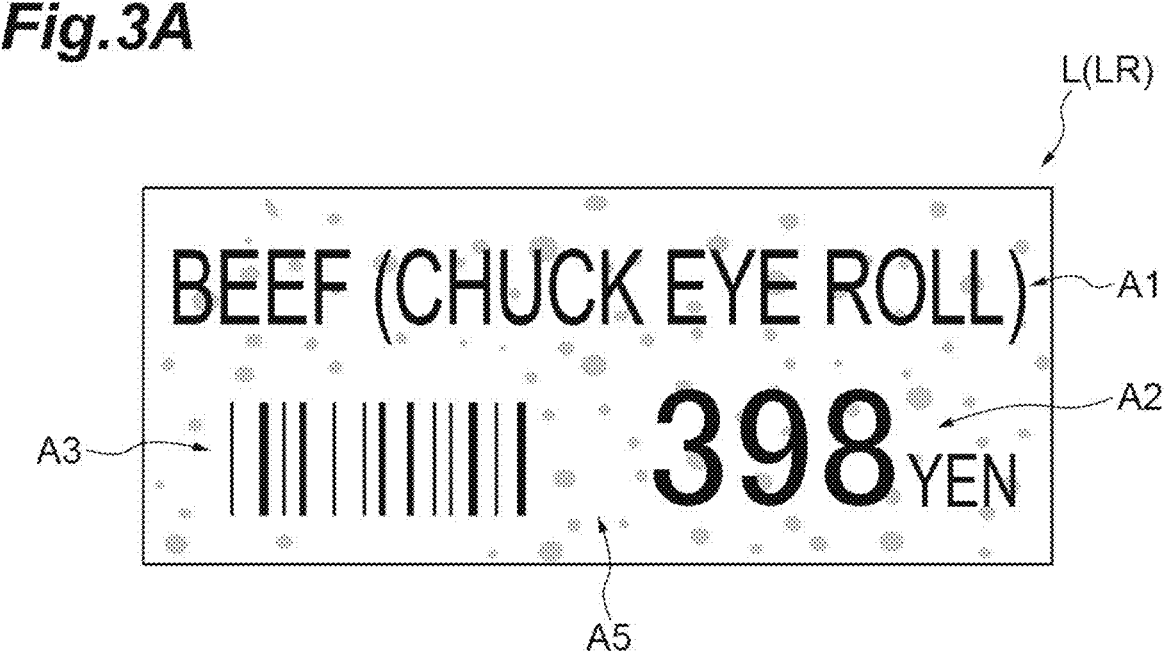
FIG. 3A is an example of a product label issued by the label printer of the embodiment.

As shown in FIG. 3A, the weighing and packaging pricing apparatus 1 has one feature in issuing the product label L on which the barcode A3, in which at least one piece of product information stored in the storage unit 94 is encoded, and the digital watermark A5, in which at least one piece of the product information encoded as the barcode A3 is embedded, are printed. The weighing and packaging pricing apparatus 1 of the present embodiment issues one product label L on which the barcode A3, in which a JAN code that is a piece of product information is encoded, and the digital watermark A5, in which the JAN code is embedded, are arranged. In addition, the weighing and packaging pricing apparatus 1 of the present embodiment issues the product label L displayed so that the digital watermark A5 surrounds the area where the barcode A3 is displayed.

In addition, the "area where the barcode A3 is displayed" referred to in this specification refers to an area between the bars arranged at both ends in the arrangement direction of the bars (synonymous with a first predetermined area PA1 shown in the lower portion) in the case of a one-dimensional barcode, and a quiet zone located outside the bars arranged at both ends (a margin area provided around the area actually printed as a barcode, that is, a predetermined margin area around a barcode whose width is determined by the standard of each barcode) is not included. That is, "displayed so that the digital watermark A5 surrounds the area where the barcode A3 is displayed" means that the digital watermark A5 may be arranged in the quiet zone or the digital watermark A5 may be arranged around the area in which the quiet zone and/or the margin area is added to the "area where the barcode A3 is displayed". In addition, also in the case of a two-dimensional barcode, the "area where the barcode A3 is displayed" refers to an area configured to include a group of cells arranged in a grid pattern, and a quiet zone arranged around the cell group is not included. However, depending on the density of the digital watermark A5 to be arranged or the accuracy of the device for reading, there is a possibility that the barcode A3 cannot be read even by arranging the digital watermark in the quiet zone. In this case, the control unit 93 may be configured so that the digital watermark is not arranged in the quiet zone and/or the margin area (configured to generate print data defining that the digital watermark is not arranged in the quiet zone and/or the margin area).

The digital watermark referred to in the present embodiment refers to information which can be visually recognized by the human eye but whose embedded information cannot be determined. An example of the digital watermark is a tint block (pattern) in which information that can be extracted by scanning using a scanner 103 (see FIG. 5) (reading means) or the like is embedded. More specifically, the digital watermark of the present embodiment refers to the above-described tint block printed on the background of characters, the barcode A3, and the like, which can be read by a human, on the product label. In addition, information included in the digital watermark can be extracted by reading a part of the digital watermark without reading the entire digital watermark by the scanner 103.

The label printer 11 issues the product label L shown in FIG. 3A described above by printing the information based on the print data generated by the control unit 93 on the label LR. Hereinafter, an example of the process flow when the control unit 93 generates print data will be described. The control unit 93 generates print data defining that the barcode A3, in which at least one piece of product information stored in the storage unit 94 is encoded, and the digital watermark A5, in which at least one piece of the product information encoded as the barcode A3 is embedded, are arranged on one product label L and the barcode A3 and the digital watermark A5 are arranged at different positions (so as not to overlap each other) on the one product label L.

In the present embodiment, the control unit 93 generates print data to arrange, on one product label L, a product name A1 that is a piece of product information stored in the storage unit 94, a price A2 obtained by multiplying the unit price, which is a piece of product information stored in the storage unit 94, by the value measured by the weighing table 21, the barcode A3 in which the JAN code stored in the storage unit 94 is encoded, and the digital watermark A5 in which the JAN code is embedded. In other words, print data is generated in which product information obtained by decoding the barcode A3 and product information obtained by decoding the digital watermark A5 are the same. In addition, as a method of arranging the barcode A3 and the digital watermark A5 at different positions on one product label L, the control unit 93 adopts an arrangement method in which the digital watermark A5 is arranged so as to surround the area where the barcode A3 is arranged.

Figure 4A:
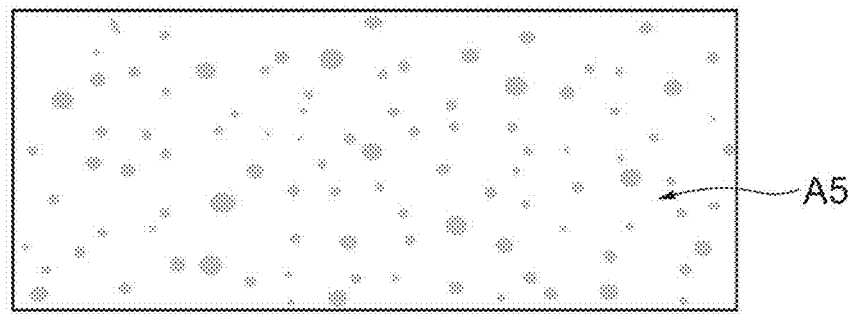
FIG. 4A is a diagram for explaining the flow of print data generation processing according to an embodiment.

A method of generating such print data will be described in more detail with reference to FIGS. 4A to 4D. The control unit 93 generates first data defining that the digital watermark A5 is arranged in the entire area of one product label L as shown in FIG. 4A (first process). The size of one product label L is stored in the storage unit 94 or the like. Then, according to a format that defines which product information is arranged in which area of one product label L, the control unit 93 generates second data defining the arrangement position of each piece of product information when it is assumed that product information other than the digital watermark A5 is printed on the product label L as shown in FIG. 4B (second process).

In addition, assuming that the arrangement direction of the bars forming the barcode A3 is a first direction and the extending direction of each bar is a second direction, the first predetermined area PA1 where the barcode A3 is arranged refers to a rectangular area having four points as its corners. The four points are two points at both ends of a bar, which is arranged at one end in the first direction, in the second direction and two points at both ends of a bar, which is arranged at the other end in the first direction, in the second direction. In addition, the definition of such a first predetermined area PA1 is an example. The first predetermined area may be, for example, an area including all bars entirely thereinside and having sides parallel to the extending direction (second direction) of each bar.

Figure 4B:
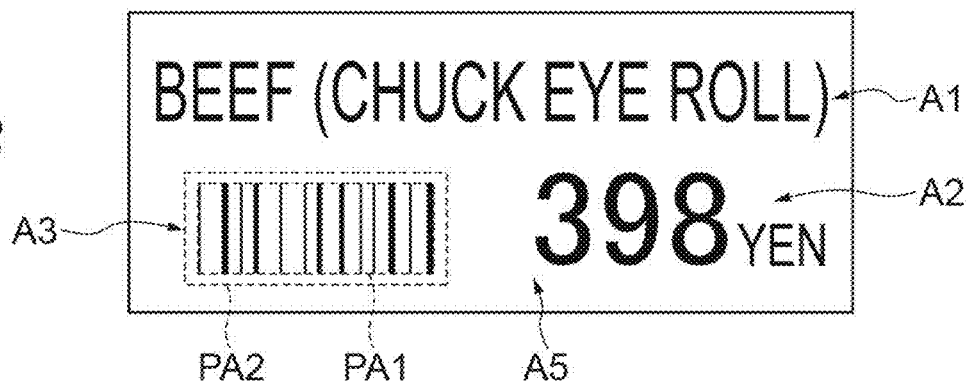
FIG. 4B is a diagram for explaining the flow of print data generation processing according to the embodiment.
Figure 4C:
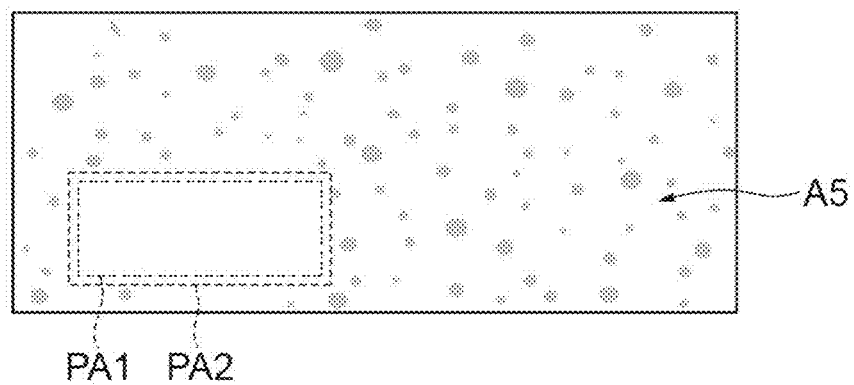
FIG. 4C is a diagram for explaining the flow of print data generation processing according to the embodiment.

Then, based on the second data described above, the control unit 93 generates modified second data defining that a frame-shaped second predetermined area (margin area) PA2 surrounding the outside of the product label L is arranged on the product label L as shown in FIG. 4B. The second predetermined area (margin area) PA2 may completely include the quiet zone described above, may include a part of the quiet zone, or may be another area that does not include the quiet zone. In addition, the control unit 93 may directly generate the modified second data without generating the second data, or may generate the modified second data by modifying the second data once generated. Then, based on the first data and the modified second data described above, the control unit 93 generates third data defining that the digital watermark A5 is not arranged in the first predetermined area PA1 and the second predetermined area PA2 in one product label L as shown in FIG. 4C (third process). Then, based on the second data and the third data described above, the control unit 93 generates print data defining that the barcode A3, in which the JAN code stored in the storage unit 94 is encoded, and the digital watermark A5, in which the JAN code is embedded, are arranged on one product label L and the barcode A3 and the digital watermark A5 are arranged at different positions (so as not to overlap each other) on the one product label L as shown in FIG. 4D (fourth process).

Figure 4D:
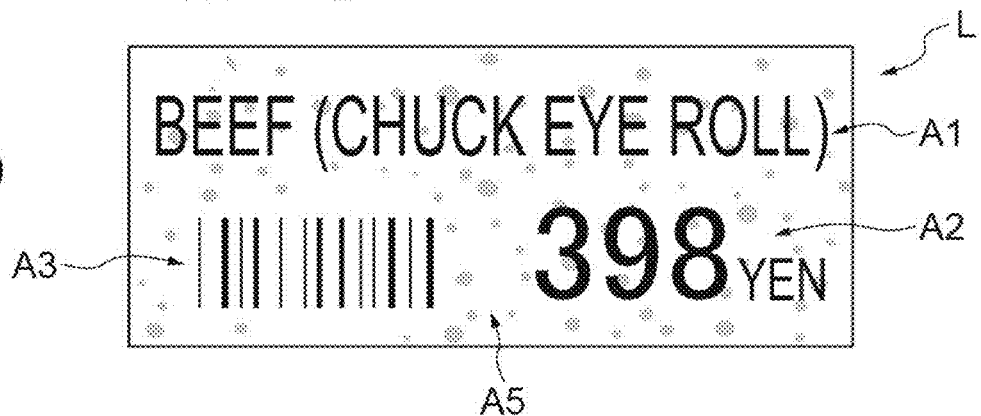
FIG. 4D is a diagram for explaining the flow of print data generation processing according to the embodiment.

The control unit 93 controls the label printer 11 to print information based on the print data generated by the process described above on the label LR, thereby issuing the product label L shown in FIG. 4D.

Figure 5:
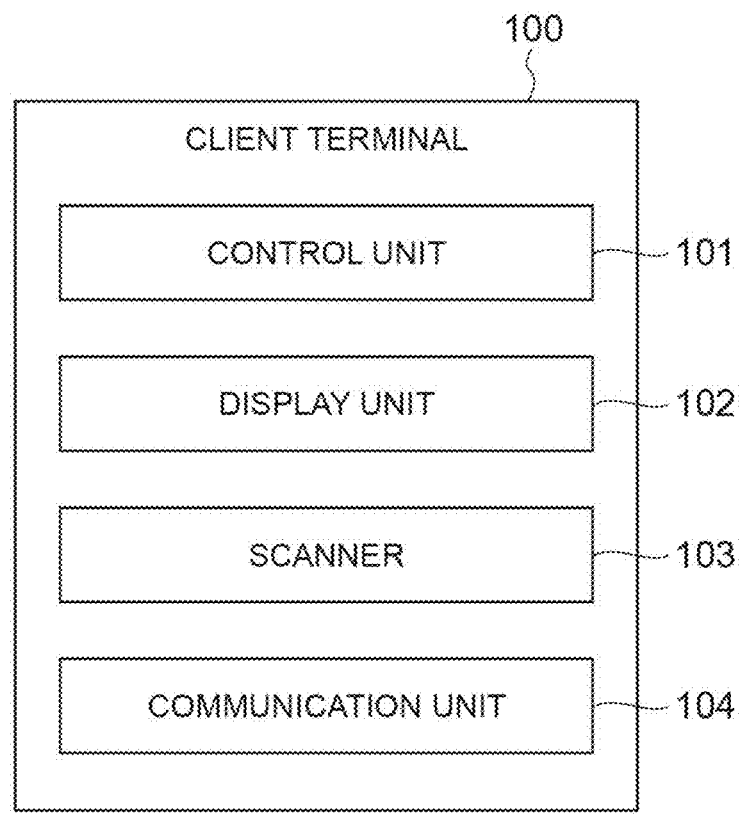
FIG. 5 is a configuration diagram showing the configuration of a client terminal.

The product label L issued in this manner can be read by, for example, the scanner (reading means) 103 provided in a client terminal (label reading apparatus) 100. The client terminal 100 is arranged, for example, in a store and used for sales management or the like. As shown in FIG. 5, the client terminal 100 includes a control unit (reading control unit) 101, a display unit 102, the scanner 103, and a communication unit 104.

The control unit 101 has an input and output interface, a storage medium such as a ROM and a RAM, a CPU, a communication circuit, and the like, and stores the input data in the RAM based on the signal output from the CPU, loads the program stored in the ROM to the RAM, and executes the program loaded to the RAM to execute various processes. If it is determined that at least one of the barcode A3 and the digital watermark A5 read by the reading means can be decoded, the control unit 101 of the present embodiment determines that the information decoded from at least one of the barcode A3 and the digital watermark A5 is product information regarding the product.

The scanner 103 reads both the barcode A3 and the digital watermark A5 printed on the product label L, and transmits the read information to the control unit 101. The display unit 102 is a unit that displays various kinds of information. In the present embodiment, the display unit 102 displays the product information decoded from the barcode A3 and the digital watermark A5 read by the scanner 103. That is, the display unit 102 of the present embodiment displays the JAN code decoded from the barcode A3 and the digital watermark A5. In addition, when both the barcode A3 and the digital watermark A5 read by the scanner 103 cannot be decoded, the display unit 102 displays the fact. The communication unit 104 is provided so as to be able to communicate with, for example, a server device. The information for decoding the barcode A3 and the digital watermark A5 read by the scanner 103 may be acquired through the communication unit 104, or may be acquired from a storage unit or the like provided in the client terminal 100.

Figure 3B:
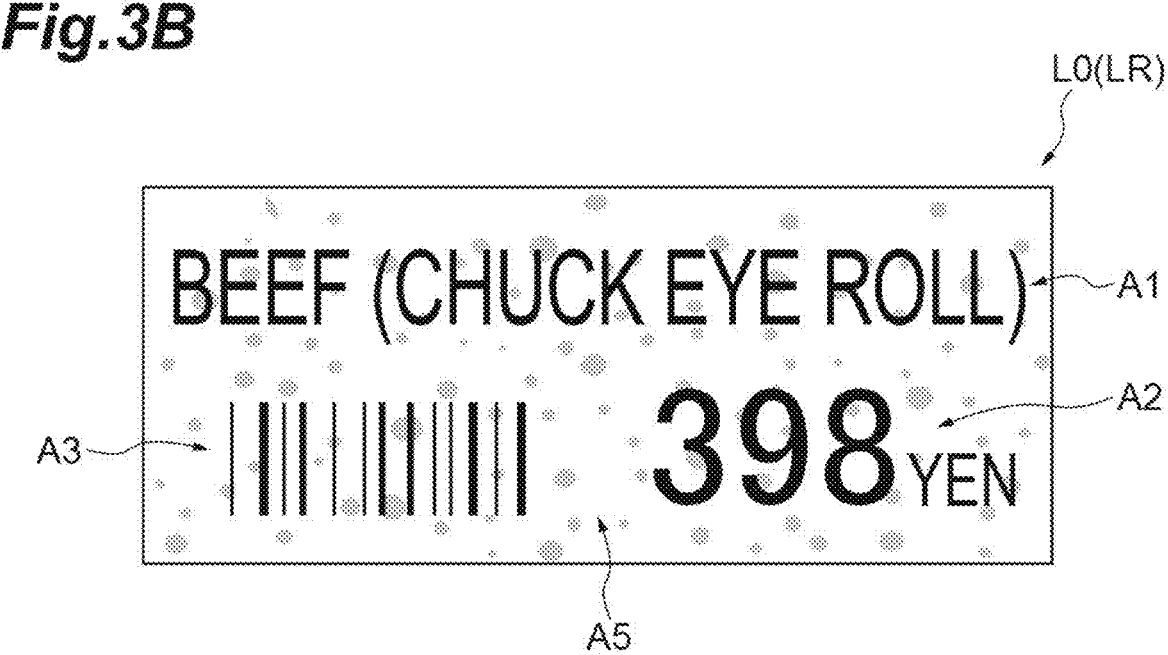
FIG. 3B is an example of a product label as a comparative example.

In the weighing and packaging pricing apparatus 1 of the embodiment described above, one product label L on which both the barcode A3 and the digital watermark A5 relevant to at least one piece of product information are displayed is issued. Therefore, for example, even if the product label L is wrinkled or a part of the barcode A3 is dirty, the product information can be acquired from the digital watermark A5. In addition, in the label printer 11 of the embodiment described above, the product label L is issued based on the print data defining that the barcode A3 and the digital watermark A5 are arranged at different positions on one product label L. For this reason, compared with a product label L0 in which the barcode A3 and the digital watermark A5 are arranged so as to overlap each other (at the same position) as shown in FIG. 3B, the contrast between the bar and the space in the barcode A3 is ensured in the product label L shown in FIG. 3A that is printed based on the print data described above. Therefore, even when both the barcode A3 and the digital watermark A5 are printed on one product label L, it is possible to reduce the lowering of the accuracy of reading the barcode A3 by the reading means such as a scanner.

In the weighing and packaging pricing apparatus 1 of the embodiment described above, the print data defining that the digital watermark A5 is arranged so as to surround the area where the barcode A3 is arranged is generated. Therefore, since the digital watermark A5 can be widely arranged on one product label L, it is possible to improve the readability of the digital watermark A5 by the scanner 103.

In the weighing and packaging pricing apparatus 1 of the embodiment described above, the product label L is issued on which the digital watermark A5 is printed so as to surround the area where the barcode A3 is printed. Therefore, since the digital watermark A5 can be widely arranged on one product label L, it is possible to improve the readability of the digital watermark A5 by the scanner 103.

In the client terminal 100 of the embodiment described above, if it is determined that at least one of the barcode A3 and the digital watermark A5 read by the scanner 103 can be decoded, the information decoded from at least one of the barcode A3 and the digital watermark A5 is determined to be product information regarding the product. Therefore, it is possible to enhance the identity between the information written on the product label L and the information read by the scanner 103.

Although one embodiment has been described above, one aspect of the invention is not limited to the embodiment described above, and various modifications can be made without departing from the spirit of the invention.

First Modification Example

The print data generated by the control unit 93 is not limited to the print data generated by the above-described processing, and may be, for example, print data generated by processing shown below. Hereinafter, a method of generating print data according to this modification example will be described in more detail with reference to FIGS. 6A to 6D.

Figure 6A:
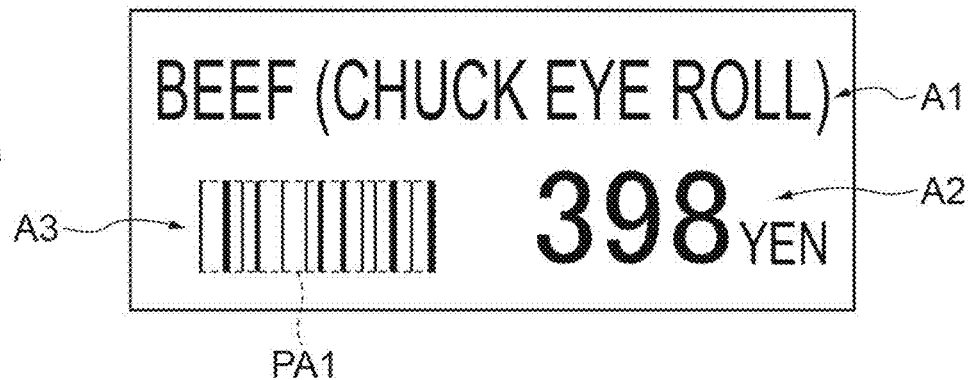
FIG. 6A is a diagram for explaining the flow of print data generation processing according to a first modification example.

The control unit 93 generates fifth data defining the arrangement position of each piece of product information when it is assumed that product information other than the digital watermark A5 is printed on the product label L as shown in FIG. 6A according to a format that defines which product information is arranged in which area of one product label L (fifth process). The fifth data of the present embodiment defines that the barcode A3 is arranged in the first predetermined area (predetermined area) PA1.

Figure 6B:
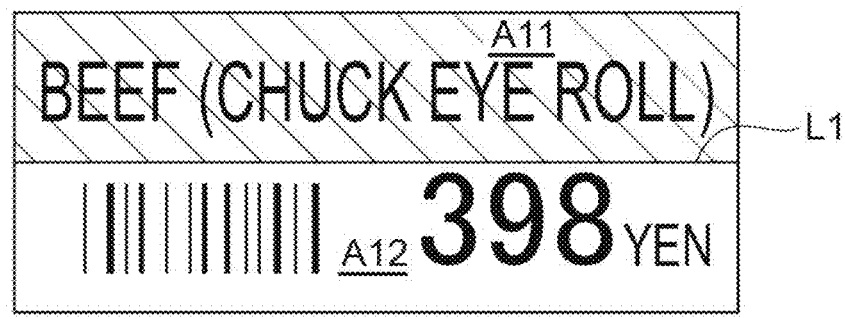
FIG. 6B is a diagram for explaining the flow of print data generation process according to the first modification example.
Figure 6C:
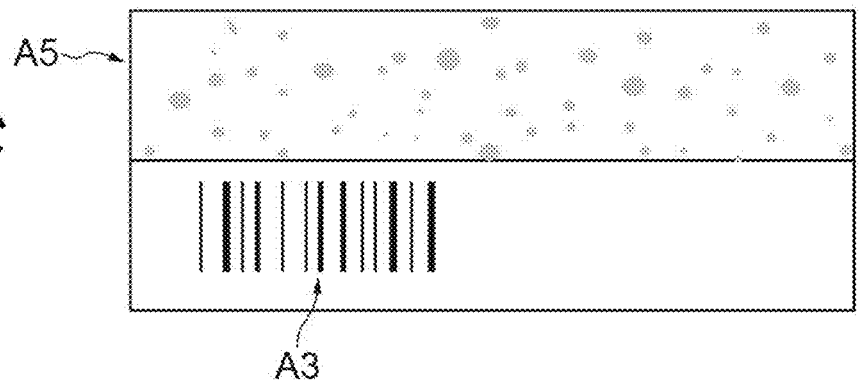
FIG. 6C is a diagram for explaining the flow of print data generation process according to the first modification example.

Then, the control unit 93 generates sixth data defining that a dividing line L1 for dividing one product label L into two areas does not cross (do not overlap) the first predetermined area PA1 as shown in FIG. 6B (sixth process). Then, based on the fifth data and the sixth data described above, the control unit 93 generates seventh data (see FIG. 6C) defining that the digital watermark A5 is arranged in the entire area A11 (hatched area) on a side where the first predetermined area PA1 is not present between the two areas A11 and A12 generated by the division by the dividing line L1 (seventh process).

Figure 6D:
FIG. 6D is a diagram for explaining the flow of print data generation process according to the first modification example.

Then, based on the fifth data and the seventh data, the control unit 93 generates print data defining that the barcode A3, in which the JAN code is encoded, and the digital watermark A5, in which the JAN code is embedded, are arranged on one product label L and the barcode A3 and the digital watermark A5 are arranged at different positions (so as not to overlap each other) on the one product label L as shown in FIG. 6D (eighth process). The control unit 93 controls the label printer 11 to print information based on the print data generated by the process described above on the label LR, thereby issuing the product label L shown in FIG. 6D.

In addition, in FIG. 6B, an example is shown in which the control unit 93 arranges the straight dividing line L1 in the left-right direction (so as not to cross the first predetermined area PA1) above the barcode A3 with a slight gap therebetween. However, the dividing line is not limited to the straight line, and may be a curved line. In addition, the dividing line may be a polygonal line. For example, a polygonal line or a curved line that passes through the upper side and the right side of the barcode A3 with a predetermined gap from the barcode A3 shown in FIG. 6A may be arranged as a dividing line.

Figure 7A:
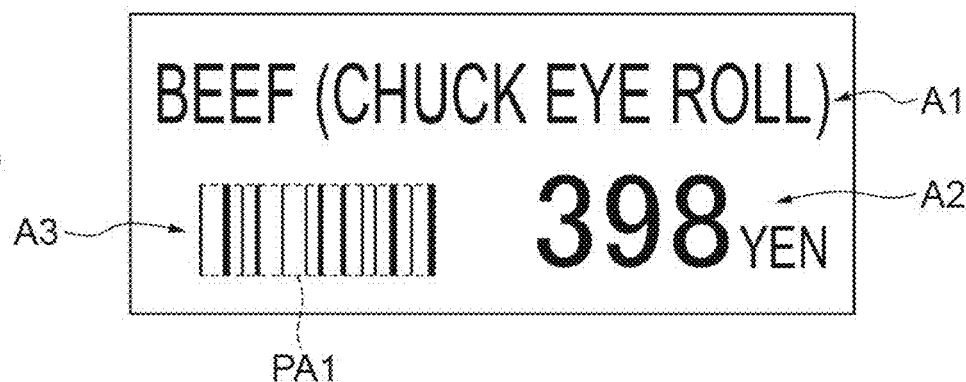
FIG. 7A is a diagram for explaining the flow of print data generation processing according to a further modification of the first modification example.
Figure 7B:
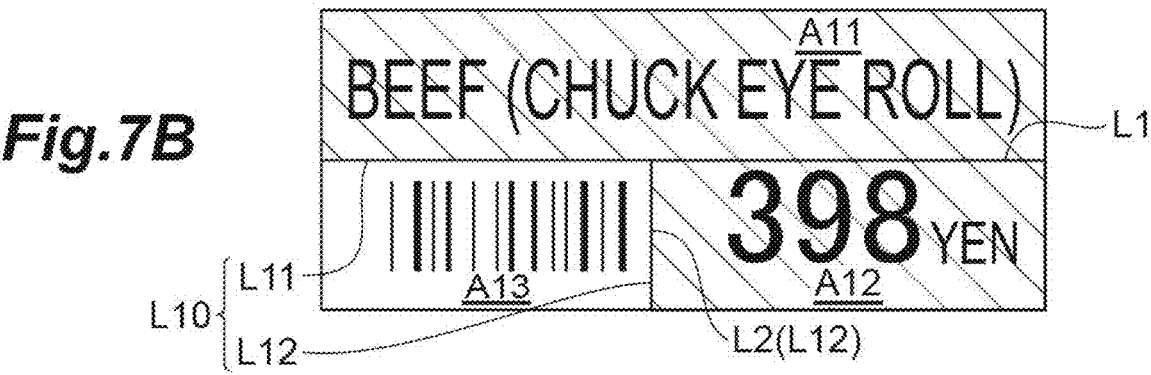
FIG. 7B is a diagram for explaining the flow of print data generation processing according to the further modification of the first modification example.
Figure 7C:
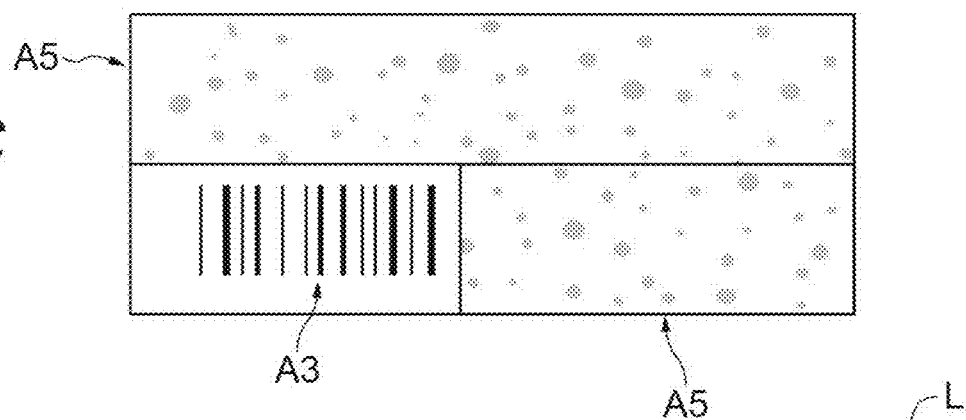
FIG. 7C is a diagram for explaining the flow of print data generation processing according to the further modification of the first modification example.
Figure 7D:
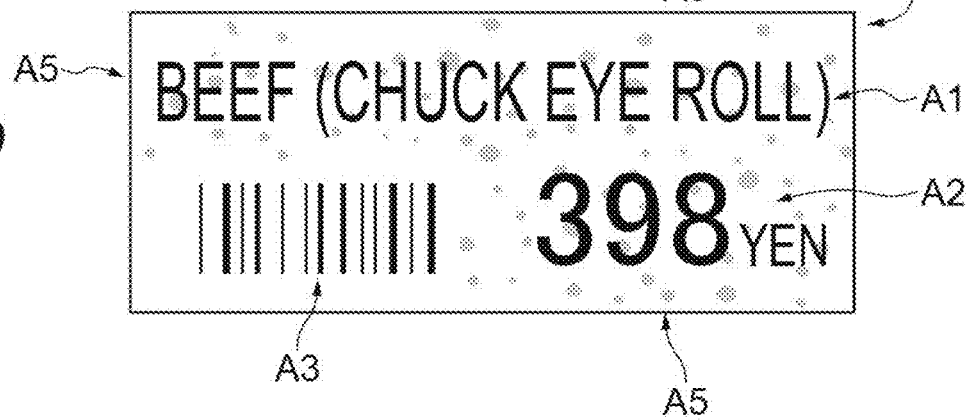
FIG. 7D is a diagram for explaining the flow of print data generation processing according to the further modification of the first modification example.

In addition, in the above modification example, an example has been described in which the control unit 93 divides one product label L into two areas as shown in FIG. 6B. However, as shown in FIGS. 7A to 7D, the control unit 93 may generate seventh data defining that one product label is divided into three areas A11, A12, and A13 by the dividing line L1 and the dividing line L2 and the digital watermark A5 is arranged in the two areas A11 and A12 other than the area A13 where the barcode A3 is arranged as shown in FIG. 7B, for example. Then, based on the fifth data and the seventh data, the control unit 93 may generate print data defining that the barcode A3, in which the JAN code is encoded, and the digital watermark A5, in which the JAN code is embedded, are arranged on one product label L and the barcode A3 and the digital watermark A5 are arranged at different positions (so as not to overlap each other) on the one product label L as shown in FIG. 7D.

In addition, in order to arrange the digital watermark A5 in the area A11 and the area A12, seventh data may be generated that defines that the area A13 defined by an L-shaped bent dividing line L10, which is formed by a straight line L11 that is a part of the dividing line L1 and a straight line L12 that completely matches the dividing line L2, and an area including the area A11 and the area A12 are specified and the digital watermark A5 is arranged in the area other than the area A13 where the barcode A3 is arranged.

As described above, the control unit 93 does not necessarily have to arrange the digital watermark A5 so as to surround the four sides (top, bottom, left, and right) of the barcode A3, and may arrange the digital watermark A5 so as to be located at one of the top, bottom, left, and right when viewed from the barcode A3.

Second Modification Example

A method of generating print data according to a second modification example will be described in more detail with reference to FIGS. 8A to 8E.

Figure 8A:
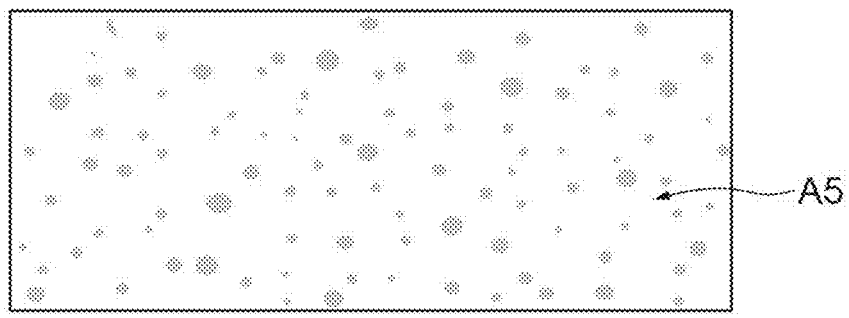
FIG. 8A is a diagram for explaining the flow of print data generation processing according to a further modification example.
Figure 8B:
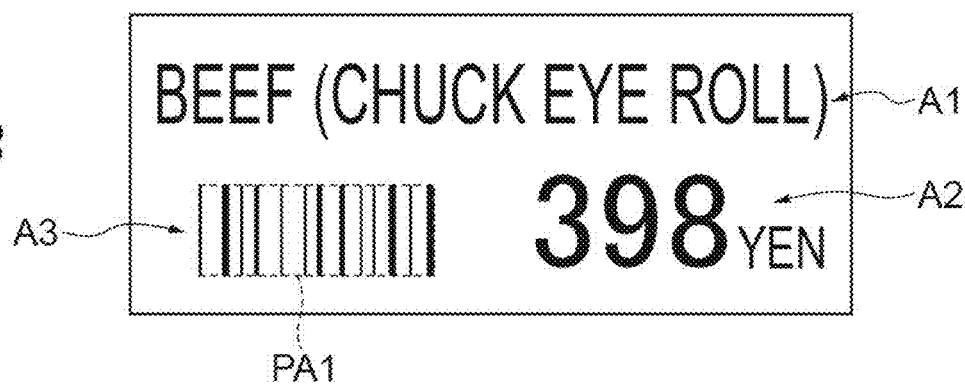
FIG. 8B is a diagram for explaining the flow of print data generation processing according to the further modification example.

The control unit 93 generates first data defining that the digital watermark A5 is arranged in the entire area of one product label L as shown in FIG. 8A. Then, according to a format that defines which product information is arranged in which area of one product label L, the control unit 93 generates second data defining the arrangement position of each piece of product information when it is assumed that product information other than the digital watermark A5 is printed on the product label L as shown in FIG. 8B. The second data of the present embodiment defines that the barcode A3 is arranged in the first predetermined area PA1. In addition, the second data does not necessarily have to be generated in a state in which the barcode A3 is actually arranged in the first predetermined area PA1.

Figure 8C:
FIG. 8C is a diagram for explaining the flow of print data generation processing according to the further modification example.

Then, based on the first data and the second data described above, the control unit 93 generates fifth data defining that the product name A1 that is a piece of product information stored in the storage unit 94, the price A2 obtained by multiplying the unit price, which is a piece of product information stored in the storage unit 94, by the value measured by the weighing table 21, and the digital watermark A5 in which the JAN code is embedded are arranged on one product label L as shown in FIG. 8C.

Figure 8D:
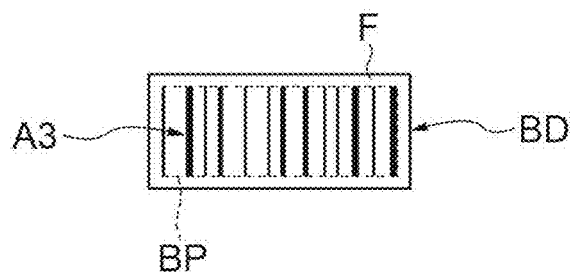
FIG. 8D is a diagram for explaining the flow of print data generation processing according to the further modification example.
Figure 8E:
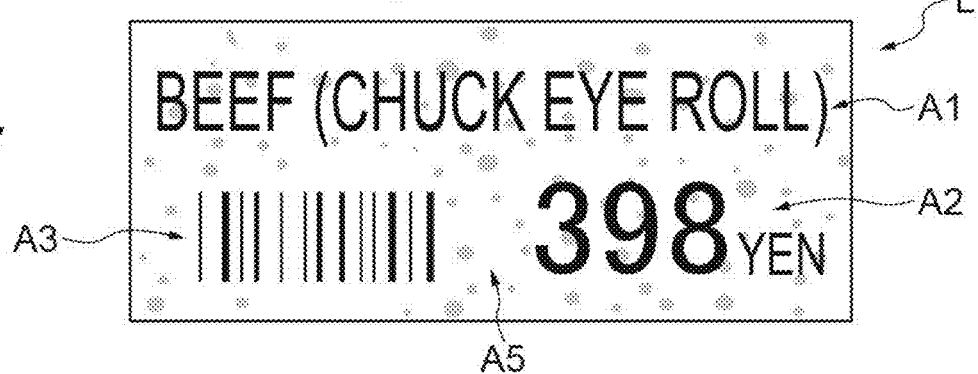
FIG. 8E is a diagram for explaining the flow of print data generation processing according to the further modification example.

Then, as shown in FIG. 8D, the control unit 93 generates barcode image data BD including the barcode A3 and a frame-shaped portion F surrounding the barcode A3. That is, the barcode image data BD is one size larger than the size of the barcode A3. The frame-shaped portion F is a margin area where information such as characters is not displayed. By superimposing the barcode image data BD on the fifth data from which the product label L shown in FIG. 8C can be issued, the control unit 93 generates print data defining that the barcode A3, in which the JAN code is encoded, and the digital watermark A5, in which the JAN code is embedded, are arranged on one product label L and the barcode A3 and the digital watermark A5 are arranged so as not to overlap each other on the one product label L as shown in FIG. 8E.

Third Modification Example

In the weighing and packaging pricing apparatus 1 of the embodiment and the second modification example described above, an example has been described in which a margin area is formed around the barcode A3 and the digital watermark A5 is arranged around the margin area. However, the invention is not limited thereto. For example, the digital watermark A5 may be arranged in the margin area.

Fourth Modification Example

In the embodiment and the modification examples described above, the case where the product information encoded as the barcode A3 and the product information embedded as the digital watermark A5 are completely the same has been described as an example. However, in addition to the product information (JAN code) encoded as the barcode A3, other pieces of product information (for example, information on allergic ingredients, information of transportation route from processing to sale and inspection record, or URL information of WEB page where these pieces of information can be viewed) may be embedded. In addition, the individual identification number of a product may be embedded as a digital watermark. Since the digital watermark can generally include a larger amount of information than the barcode A3, various kinds of information can be further included in addition to (a part of) the information of the barcode A3.

Fifth Modification Example

When the label LR is a mountless label to which no mount is attached, instead of or in addition to the functional configuration of the control unit 93 of the embodiment described above, the control unit (print control unit) 93 of a fifth modification example may generate print data, in which the arrangement area of the digital watermark is specified, based on the size of the product label L predicted from a product information display portion A0 (see FIG. 9A) in which at least one piece of product information stored in the storage unit 94 is displayed, when the digital watermark in which at least one piece of product information (for example, JAN code) stored in the storage unit 94 is embedded is arranged on the product label L.

Figure 9A:
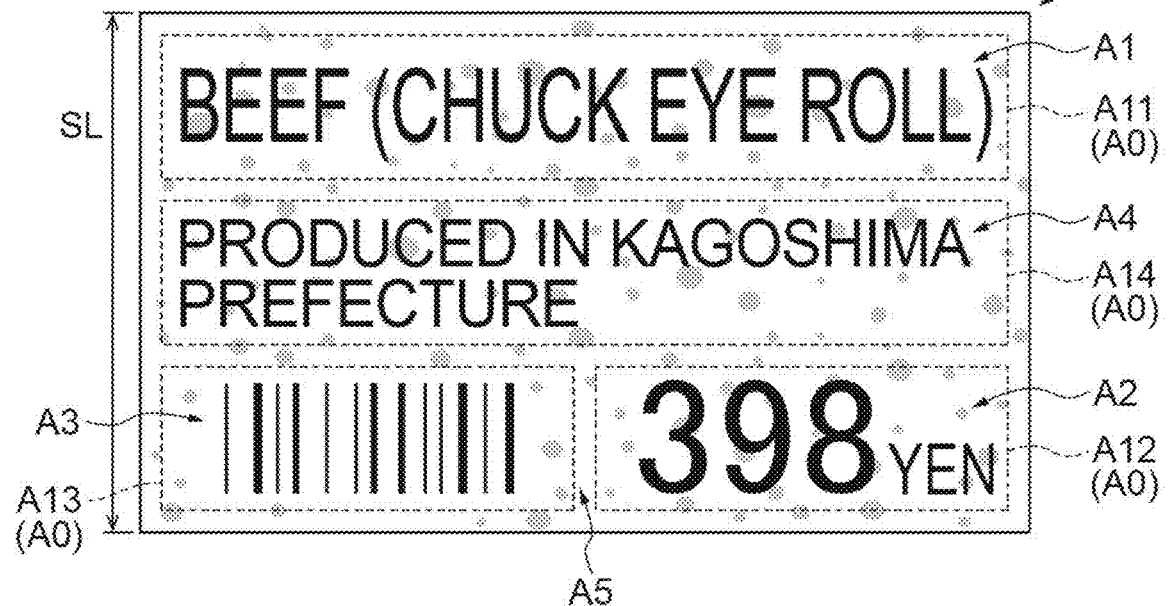
FIG. 9A is a diagram for explaining a product label issued by a label printer according to a fifth modification example.

As shown in FIG. 9A, the control unit 93 generates print data defining that the product information display portion A0 in which at least one piece of product information stored in the storage unit 94 is displayed (in this fifth modification example, a product name A1, a production area A4, a price A2, and a barcode A3) and the digital watermark A5, in which at least one piece of product information stored in the storage unit 94 is embedded, are arranged on one product label L and an arrangement area where the digital watermark A5 is arranged in the product label L is specified based on the size of the product label L predicted from the product information display portion A0.

More specifically, in this fifth modification example, the control unit 93 generates print data defining that the product name A1 (product information display portion A0) that is a piece of product information stored in the storage unit 94, the production area A4 (product information display portion A0) that is a piece of product information stored in the storage unit 94, the price A2 (product information display portion A0) obtained by multiplying the unit price, which is a piece of product information stored in the storage unit 94, by the value measured by the weighing table 21, the barcode A3 in which the JAN code stored in the storage unit 94 is encoded, and the digital watermark A5 in which the JAN code is embedded are arranged on one product label L.

In addition, the control unit 93 of this fifth modification example generates print data defining that the arrangement area of the digital watermark A5 in the product label L is specified based on the size SL of the product label L predicted from the display sizes of the product name A1, the production area A4, the price A2, and the barcode A3 as the product information display portion A0. In the upper part, it has been described that the product label L is issued by printing information based on the print data on the mountless label LR unwound from the label roll. However, each of the size SL of the product label L and the size of the product information display portion A0 described above means the size of the mountless label LR in the unwinding direction. In addition, in this fifth modification example, the product information obtained by decoding the barcode A3 and the product information obtained by decoding the digital watermark A5 are the same.

Figure 9B:
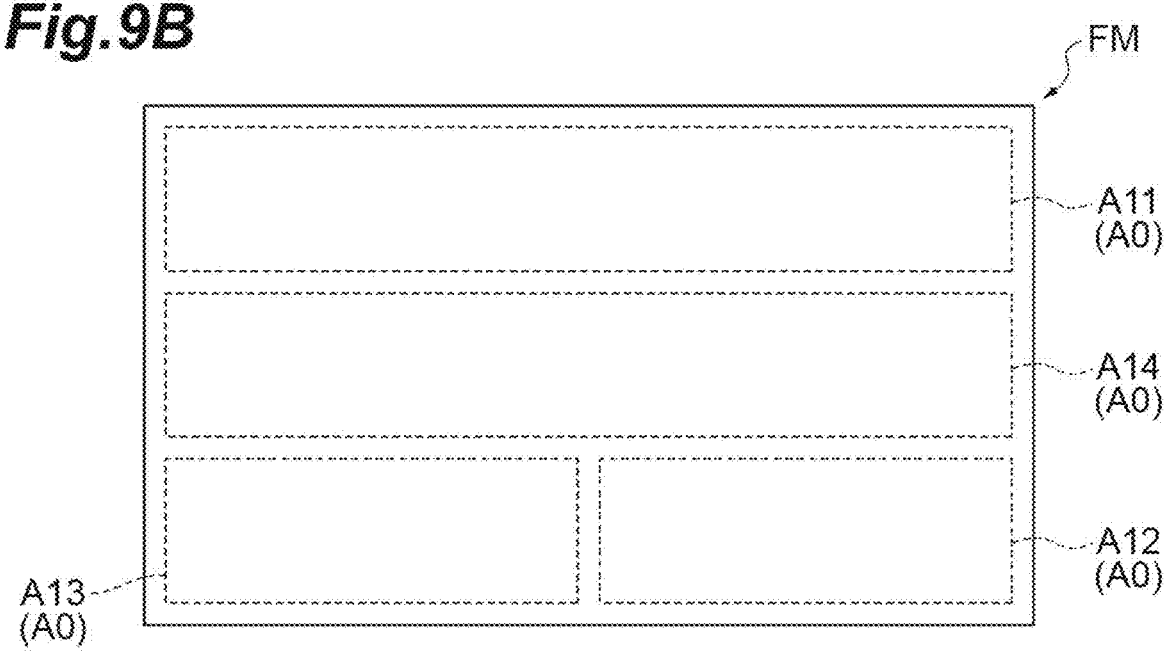
FIG. 9B is a diagram for explaining an example of a format of the label printer according to the fifth modification example.

As described above, the control unit 93 that prints the product information on the mountless label generates print data according to a format FM that defines which product information is arranged in which area of one product label L. For example, as shown in FIG. 9B, the format FM defines that a product name, a production area, a price, and a barcode are printed from the upper end to the lower end of the product label L and the product name, the production area, the price, and the barcode are written in the area A11, the area A14, the area A12, and the area A13, respectively.

When all the pieces of information corresponding to the product name, the production area, the price and the barcode defined as the format FM are stored in the storage unit 94, the control unit 93 generates print data defining that the product name, the production area, the price, and the barcode are arranged on one product label L as shown in FIG. 3A and that the arrangement area of the digital watermark A5 in the one product label L on which the product name, the production area, the price, and the barcode are arranged is specified based on the size SL of the product label L predicted from the display sizes of the product name, the production area, the price, and the barcode as the product information display portion A0. That is, the print data is generated such that the product label L shown in FIG. 3A is printed on the mountless label LR. In addition, the print data of the present embodiment is defined to print the product label L so that the digital watermark A5 is not superimposed on the barcode A3 as shown in FIG. 3A.

In the weighing and packaging pricing apparatus 1 of the fifth modification example, the arrangement area of the digital watermark A5 in the product label L is specified based on the size SL of the product label L predicted from the product information display portion A0 printed as the product label L. Therefore, a situation in which the size of the digital watermark A5 is extremely smaller or larger than the size of the product information display portion A0 does not occur. This solves a problem that the digital watermark A5 is not arranged over the entire size SL of the product label L and a problem that a margin portion where only the digital watermark A5 is printed is formed. That is, when issuing the product label L by printing the information including the digital watermark A5 on the mountless label LR, it is possible to issue the product label L having a high readability of the digital watermark A5 by the scanner 103 and a small margin portion.

In the weighing and packaging pricing apparatus 1 of the fifth modification example, since the control unit 93 specifies the entire size SL of the product label L predicted from the product information display portion A0 as the arrangement area of the digital watermark A5, the digital watermark A5 can be widely arranged on one product label L. Therefore, it is possible to improve the readability of the digital watermark A5 by the scanner 103.

Other Modification Examples

In the embodiment described above, an example has been described in which the control unit 93 generates data defining that the digital watermark A5 is arranged in the entire area of one product label L as shown in FIG. 4A and then generates data defining that the digital watermark A5 is not arranged in the second predetermined area PA2 in one product label L as shown in FIG. 4C. However, the invention is not limited thereto. For example, the control unit 93 may generate data defining that the digital watermark A5 is arranged as shown in FIG. 4A and then divide the data into a predetermined number of pieces of data (for example, four pieces of data) and superimpose the divided pieces of data around the area where the barcode A3 is arranged (for example, on four sides). Even in this case, the control unit 93 can generate print data defining that the digital watermark A5 is arranged around the barcode A3.

In the embodiment and the modification examples described above, an example has been described in which the control unit 93 generates print data in which the digital watermark A5 is arranged so as to be continuous. However, the control unit 93 may generate print data in which the digital watermark A5 is arranged so as to be divided into two or more areas.

In the embodiment and the modification examples described above, an example has been described in which the product label L having product information printed on the label LR with a mount is issued. However, a product label having product information printed on a mountless label may be issued. In this case, the control unit 93 may determine the size of the product label based on the product information included in the print data. In this configuration, it is possible to prevent the product label from becoming unnecessarily long.

In the embodiment and the modification examples described above, the case where the product label L issued from the label printer 11 is used for the purpose of sales management in a store or the like has been described as an example. However, for example, the product label L issued from the label printer 11 may be used for the purpose of inventory management, distribution management, and the like in warehouses, processing centers, and the like. In this case, as examples of product information encoded as the barcode A3 and product information embedded as the digital watermark A5, it is conceivable that the identification number of the product or the like is barcoded and digitally watermarked or information, such as the store name of the delivery destination, product name, and quantity, is barcoded and digitally watermarked.

In addition, in the embodiment and the modification examples described above, an example has been described in which the position of the barcode A3 is the lower left on the entire product label L. However, the barcode A3 may be arranged anywhere on the product label L. The control unit 93 appropriately sets the area of the digital watermark A5 according to the position of the barcode A3.

In addition, in the embodiment and the modification examples described above, an example in which one barcode A3 is arranged on the product label L is shown. However, the number of barcodes A3 is not limited to one. When arranging a plurality of barcodes A3, the control unit 93 arranges the barcodes A3 and the digital watermark A5 so that none of the barcodes A3 overlaps the digital watermark A5.

In addition, in the embodiment and the modification examples described above, an example in which the barcode A3 arranged on the product label L is a so-called one-dimensional barcode is shown. However, the invention is not limited thereto. For example, a so-called two-dimensional barcode (for example, a QR code (registered trademark)) may be arranged instead of the one-dimensional barcode.

In the embodiment and the modification examples described above, an example has been described in which the control unit (print control unit) 93 for generating print data is built in the main body of the weighing and packaging pricing apparatus 1. However, the control unit 93 may be provided, for example, in an external server capable of communicating with the weighing and packaging pricing apparatus 1. That is, in the weighing and packaging pricing apparatus 1 according to the modification example, the control unit 93 provided in the external server may acquire information from the storage unit 94 to generate the above-described print data, and the label printer 11 provided in the main body of the weighing and packaging pricing apparatus 1 may download or receive the above-described print data from the control unit 93 and print the information based on the print data on the label LR, thereby issuing the product label L on which the barcode A3 and the digital watermark A5 are displayed at different positions.

In the embodiment described above, a label issuing and attaching device having a weighing function and a packaging function for weighing a product and then packaging the product with a film has been described as an example. However, one aspect of the invention may be applied to a product label issuing device having only a function of issuing a product label. The invention can be applied to various devices having a function of issuing a product label.

What is claimed is:

1. A label reading apparatus, comprising:
   a reading unit configured to read a product label issued from a label issuing apparatus, the label issuing apparatus including a storage unit configured to store a plurality of pieces of product information regarding a product, a print control unit configured to generate print data defining that a barcode, in which at least one piece of the product information stored in the storage unit is encoded, and a digital watermark, in which at least one piece of the product information encoded as the barcode is embedded, are arranged on one product label and the barcode and the digital watermark are arranged at different positions on the one product label, and a label issuing unit configured to issue the product label on which the barcode and the digital watermark are displayed at different positions by printing information based on the print data on a label; and
   a reading control unit configured to decode read information,
   wherein the reading unit reads both the barcode and the digital watermark printed on the product label, and
   wherein the reading control unit provides a notification of a decoding failure when the reading unit fails to decode both the barcode and the digital watermark.

2. The label reading apparatus according to claim 1, wherein when it is determined that at least one of the barcode and the digital watermark read by the reading unit is decodable, the reading control unit determines that information decoded from at least one of the barcode and the digital watermark is the product information regarding the product.

* * * * *